United States Patent
Egawa et al.

[11] Patent Number: 6,154,168
[45] Date of Patent: Nov. 28, 2000

[54] APPARATUS AND METHOD FOR PERFORMING AUTOMATIC CONTROL OVER VELOCITY OF AUTOMOTIVE VEHICLE

[75] Inventors: Kenichi Egawa, Tokyo; Satoshi Tange, Yokohama, both of Japan

[73] Assignee: Nissan Motor Co., Ltd., Yokohama, Japan

[21] Appl. No.: 09/287,166

[22] Filed: Apr. 6, 1999

[30] Foreign Application Priority Data

Apr. 6, 1998 [JP] Japan .................................. 10-093031

[51] Int. Cl.[7] ............................. G01S 13/93; B60K 31/00
[52] U.S. Cl. ............................. 342/71; 342/70; 342/455; 340/903; 701/96
[58] Field of Search .................................. 342/70, 71, 72, 342/455; 340/903; 180/167, 168, 169; 701/96

[56] References Cited

U.S. PATENT DOCUMENTS

| | | | |
|---|---|---|---|
| 4,703,429 | 10/1987 | Sakata | 342/70 |
| 5,710,565 | 1/1998 | Shirai et al. | 342/70 |
| 5,977,869 | 11/1999 | Andreas | 340/441 |
| 5,978,731 | 11/1999 | Matsuda | 701/208 |

FOREIGN PATENT DOCUMENTS

| | | |
|---|---|---|
| 19650168 | 6/1998 | Germany . |
| 6-206469 | 7/1994 | Japan . |

*Primary Examiner*—Ian J. Lobo
*Attorney, Agent, or Firm*—Foley & Lardner

[57] ABSTRACT

In automatic velocity controlling apparatus and method for an automotive vehicle, an inter-vehicle distance detector is provided for detecting an inter-vehicle distance from the vehicle to another vehicle which is running at the detected inter-vehicle distance with respect to the vehicle. A vehicular running controller is provided for effecting a vehicular running control such that the vehicle follows up the other vehicle maintaining the inter-vehicle distance to the other vehicle at a predetermined inter-vehicle distance. An inter-vehicle distance determinator is provided for determining whether the inter-vehicle distance detector transfers from a first state in which the inter-vehicle distance to the other vehicle is detected to a second state in which the inter-vehicle distance to the other vehicle is undetected. A deceleration controlled state determinator is provided for determining whether the vehicle is in a deceleration controlled state when the inter-vehicle distance determinator determines that the vehicle has transferred from the first state to the second state. A deceleration keep command generator is provided for generating and outputting a vehicular deceleration keep command to the vehicular running controller to maintain a vehicular deceleration at a value which is immediately before the inter-vehicle distance determinator determines that the inter-vehicle distance detector has transferred from the first state to the second state when the deceleration controlled state determinator determines that the vehicle is in the deceleration controlled state.

20 Claims, 7 Drawing Sheets

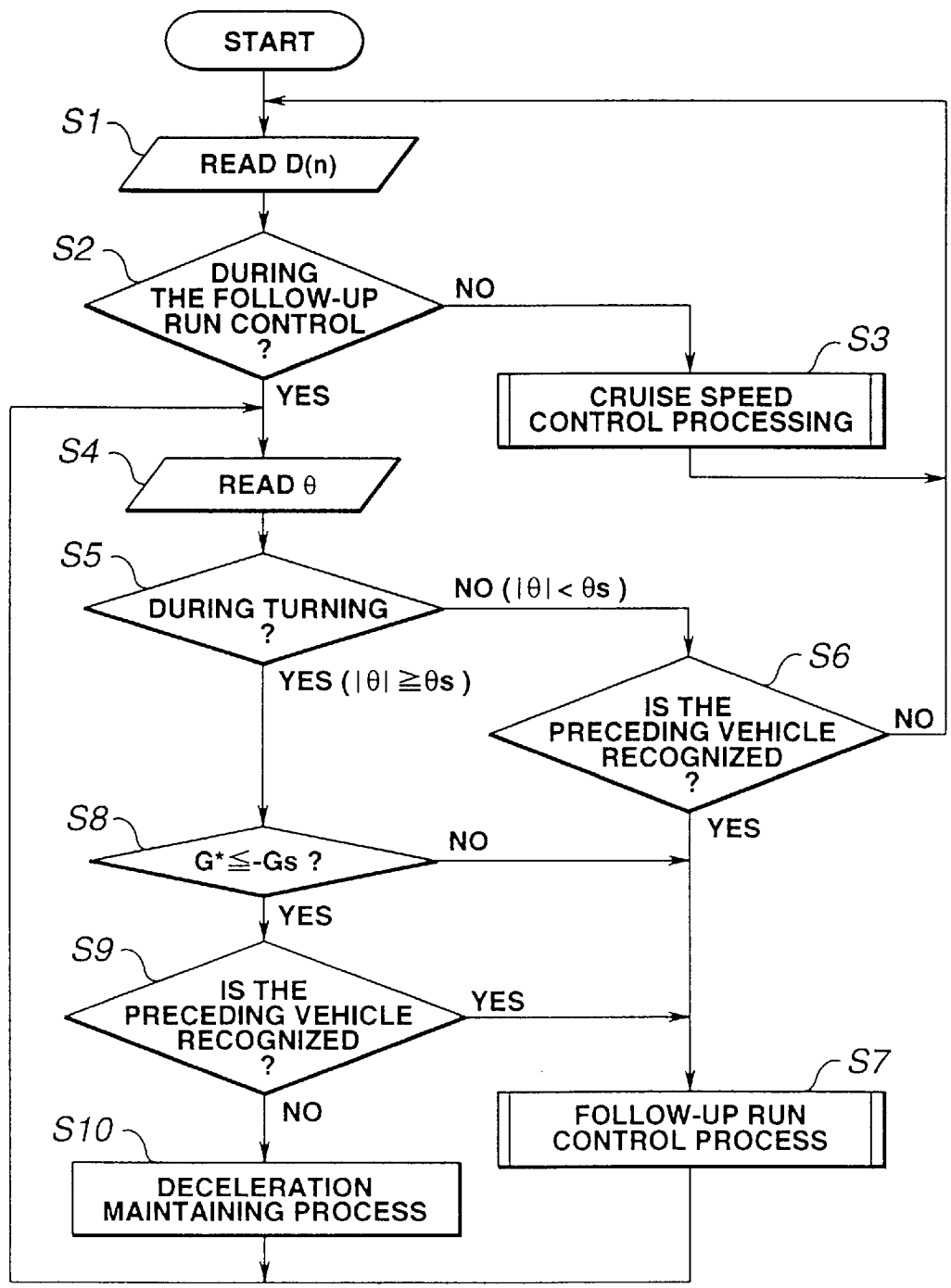

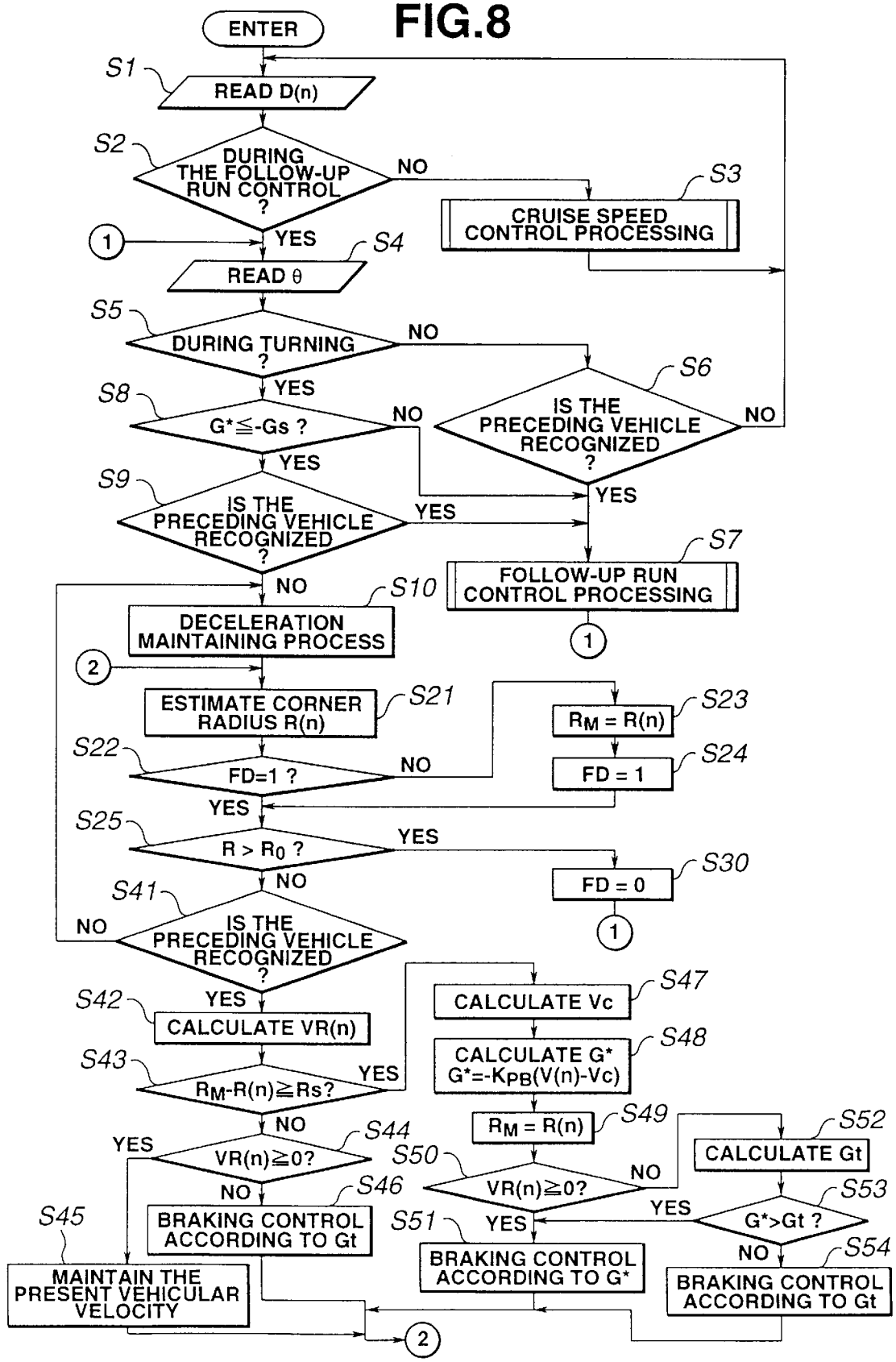

APPARATUS AND METHOD FOR PERFORMING AUTOMATIC CONTROL OVER VELOCITY OF AUTOMOTIVE VEHICLE

BACKGROUND OF THE INVENTION a) Field of the Invention

The present invention relates to apparatus and method for performing an automatic control over a velocity of an automotive vehicle in which the apparatus is mounted so as to maintain an inter-vehicle distance from the vehicle to another vehicle running ahead of the vehicle to follow up the other vehicle.

b) Description of the Related Art

A Japanese Patent Application First Publication (non-examined) No. Heisei 6-206469 published on Jul. 26, 1994 exemplifies a previously proposed automatic vehicular velocity control system.

In the previously proposed automatic vehicular velocity control system disclosed in the above-identified Japanese Patent Application First Publication, a radar unit is used to detect an inter-vehicle distance from the vehicle to a preceding vehicle which is running ahead of the vehicle. In a case where a variation rate of the inter-vehicle distance is equal to or below a distance variation threshold value, a variation rate of a magnitude of a reflected signal onto the radar unit is equal to or above a magnitude variation threshold value, and the vehicle is running on a curved road, the apparatus determines that the preceding vehicle has changed from the preceding vehicle running on the same traffic lane and transfers the vehicular velocity control mode from a preceding vehicle following up run mode into a mode of maintaining the vehicular velocity at the present vehicular velocity. The present vehicular velocity is a vehicular velocity when the above three conditions are established.

SUMMARY OF THE INVENTION

However, in the previously proposed vehicular velocity controlling system described in the BACKGROUND OF THE INVENTION, the preceding vehicle has disappeared, i.e., the preceding vehicle has become out of a detectable range of the radar unit, the vehicular velocity control mode has been transferred from the preceding vehicle follow-up run mode to the present vehicular velocity maintaining mode. Hence, in a case where the vehicle follows up the preceding vehicle decelerating the vehicle on the curved road and the radar unit become undetectable to trap the preceding vehicle, the vehicle falls in a cruise speed control mode in which the present vehicular velocity is maintained. Since the preceding vehicle is continued to be in a vehicular deceleration state, the inter-vehicle distance between the vehicle and the preceding vehicle tends to be shortened. In addition, when the preceding vehicle is again recognized by the radar unit, the vehicular follow-up running control is again started so that the inter-vehicle distance is returned to its appropriate value. Accordingly, the radar unit has furthermore again disappeared the preceding vehicle and the vehicle is again returned to the present vehicular velocity maintaining mode so that the inter-vehicle distance becomes shortened. Consequently, a smooth vehicular run cannot be achieved.

It is, therefore, an object of the present invention to provide apparatus and method for performing an automatic control over the vehicular velocity which can achieve a smooth run of the vehicle even when the vehicle is decelerated and is running on the curved road while the preceding vehicle has disappeared.

The above-described object can be achieved by providing an apparatus for an automotive vehicle. That is to say, an apparatus for an automotive vehicle, comprising: an inter-vehicle distance detector for detecting an inter-vehicle distance from the vehicle to another vehicle which is running at the detected inter-vehicle distance with respect to the vehicle; a vehicular running controller for effecting a vehicular running control such that the vehicle follows up the other vehicle maintaining the inter-vehicle distance to the other vehicle at a predetermined inter-vehicle distance; an inter-vehicle distance determinator for determining whether the inter-vehicle distance detector transfers from a first state in which the inter-vehicle distance to the other vehicle is detected to a second state in which the inter-vehicle distance to the other vehicle is undetected; a deceleration controlled state determinator for determining whether the vehicle is in a deceleration controlled state when the inter-vehicle distance determinator determines that the vehicle has transferred from the first state to the second state; and a deceleration keep command generator for generating and outputting a vehicular deceleration keep command to the vehicular running controller to maintain a vehicular deceleration at a value which is immediately before the inter-vehicle distance determinator determines that the inter-vehicle distance detector has transferred from the first state to the second state when the deceleration controlled state determinator determines that the vehicle is in the deceleration controlled state.

The above-described object can also be achieved by providing a method applicable to an automotive vehicle. That is to say, a method applicable to an automotive vehicle, comprising: detecting an inter-vehicle distance from the vehicle to another vehicle which is running at the detected inter-vehicle distance with respect to the vehicle through an inter-vehicle distance detector; effecting a vehicular running control such that the vehicle follows up the other vehicle maintaining the inter-vehicle distance to the other vehicle at a predetermined inter-vehicle distance; determining whether the inter-vehicle distance detector transfers from a first state in which the inter-vehicle distance to the other vehicle is detected to a second state in which the inter-vehicle distance to the other vehicle is undetected; determining whether the vehicle is in a deceleration controlled state when determining that the vehicle has transferred from the first state to the second state; and generating a vehicular deceleration keep command to maintain a vehicular deceleration at a value which is immediately before determining that the inter-vehicle distance detector has transferred from the first state to the second state when determining that the vehicle is in the deceleration controlled state.

BRIEF DESCRIPTION OF THE DRAWINGS

FIG. 2 is an operational flowchart for explaining a running control procedure executed by the vehicular automatic running controller shown in FIG. 1A.

FIG. 8 is another flowchart for explaining the vehicular running control executed by the automatic running controller in a third preferred embodiment according to the present invention.

DETAILED DESCRIPTION OF THE PREFERRED EMDODIMENTS

Reference will hereinafter be made to the drawings in order to facilitate a better understanding of the present invention.

Figure 1A:
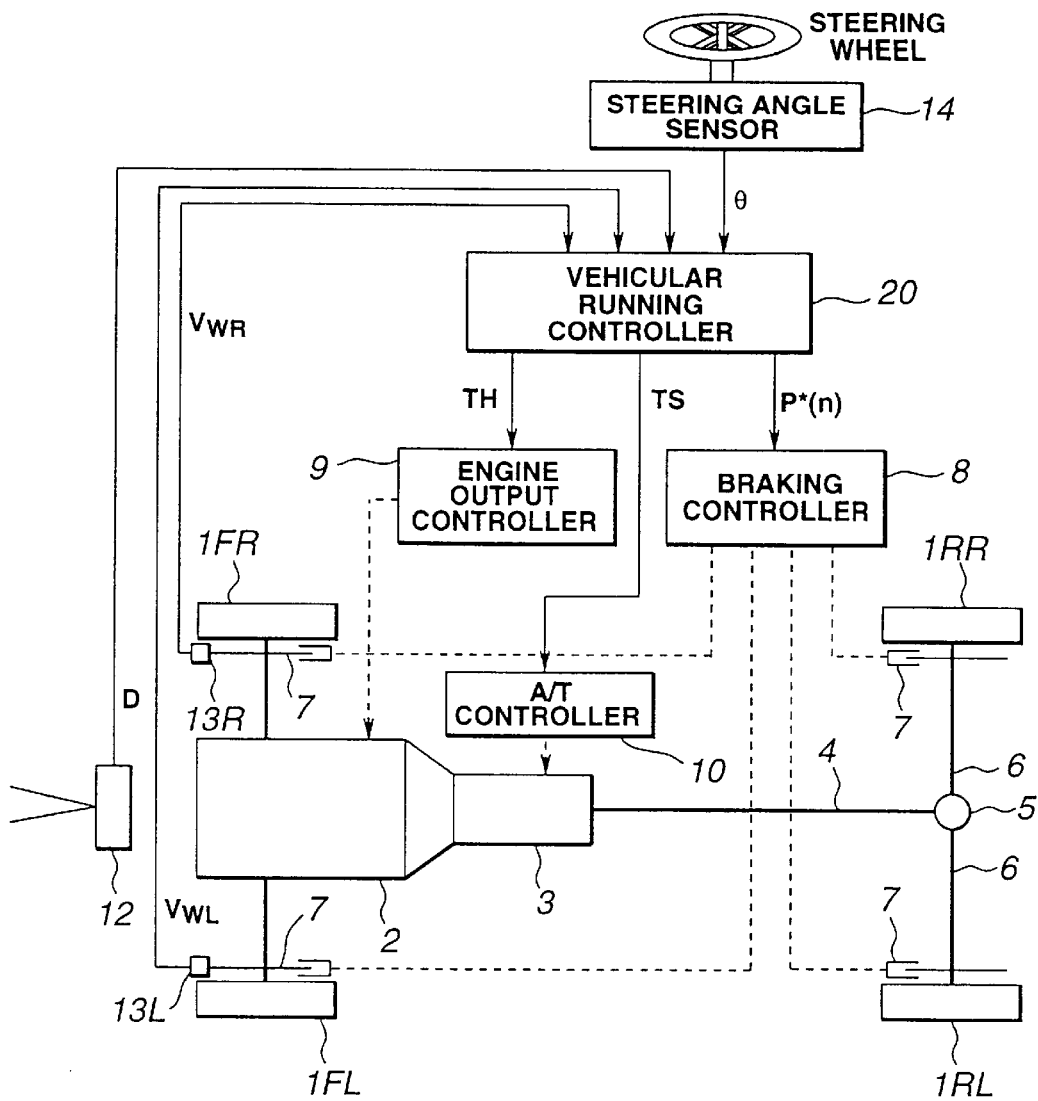
FIG. 1A is a schematic system configuration of an apparatus for performing an automatic control over a vehicular velocity of an automotive vehicle in a first preferred embodiment according to the present invention.

FIG. 1A shows a schematic configuration of an automatic vehicular velocity controlling apparatus in a first preferred embodiment according to the present invention applicable to a rear-wheel drive vehicle.

Figure 1B:
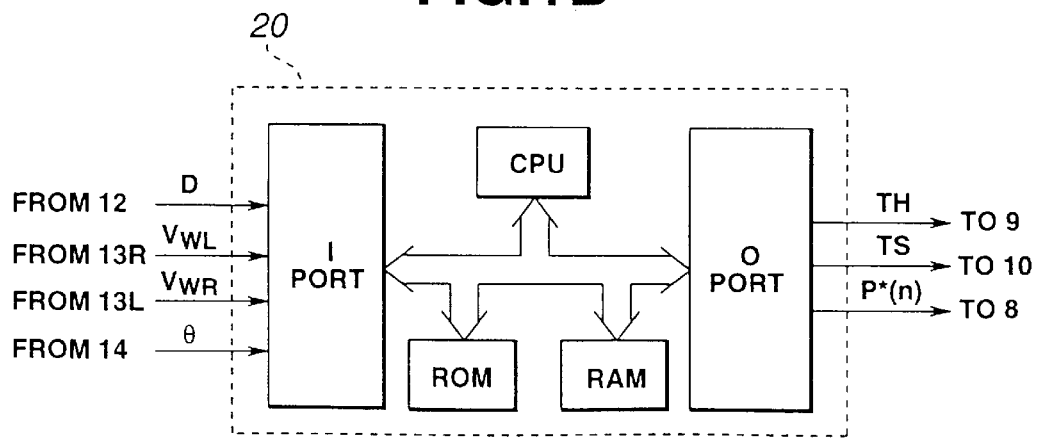
FIG. 1B is a schematic circuit block diagram of a vehicular automatic running controller shown in FIG. 1A.

FIG. 1B shows an internal configuration of a vehicular running controller shown in FIG. 1A.

In FIG. 1A, 1FL and 1FR denote rear left and right road wheels as steered wheels and 1RL and 1RR denote rear left and right road wheels as driven wheels.

A driving force of the engine 2 is transmitted to the rear left and right road wheels 1RL and 1RR to be drivingly rotated via an automatic transmission 3, a propeller shaft 4, a final differential (speed reduction) gear 5, and an axle 6.

A disc brake 7 is disposed on each of the front and rear left and right road wheels 1FL, 1FR, 1RL, and 1RR for generating a braking force to be applied to each corresponding road wheel and a braking liquid pressure of the disc brake 7 is controlled by means of a braking controller 8.

The braking controller 8 generates the braking liquid pressure for each disc brake 7 according to a depression depth of a brake pedal of the vehicle (manipulated variable of the brake pedal).

In addition, the braking controller 8 generates the braking liquid pressure in response to a braking pressure command value (a target braking liquid pressure) from the vehicular (automatic) run controller 20 as will be described later.

In addition, an engine output controller 9 to perform a control over an output of an engine 2 is disposed on the engine 2. A method of controlling the engine output includes a method of controlling an engine speed by adjusting an opening angle of an engine throttle valve or includes a method of controlling an engine idling speed by adjusting an idling control valve. In the first embodiment, the former method of controlling the engine speed by adjusting the throttle valve has been adopted.

Furthermore, an automatic transmission (A/T) controller 10 is disposed for controlling a gear shift position of an automatic transmission 3. The transmission controller 10 performs an up-shift or down-shift operation on the gear shift position of the automatic transmission 3 when an up or down shift command value TS from a vehicular running controller 20 as will be described later is inputted.

On the other hand, an inter-vehicle distance sensor 12 is disposed on a lower part of a vehicle body located on a forward position of the vehicle. The inter-vehicle distance sensor 12 is constituted by a radar unit.

The inter-vehicle distance sensor 12 constituted by the radar unit is exemplified by a U.S. Pat. No. 5,710,565(, the disclosure of which is herein incorporated by reference).

In addition, road wheel velocity sensors 13L and 13R are interposed between a vehicle body, the front left road wheel 1FL and between the vehicle body and the front right road wheel 1FR for detecting road wheel velocities of the corresponding road wheels 1FL and 1FR. Furthermore, a steering angle sensor 14 is disposed on a steering wheel of the vehicle for detecting a steering angular displacement θ.

Each output signal of the inter-vehicle distance sensor 12, the steering angle sensor 14, and road wheel velocity sensors 13L and 13R is inputted into the vehicular (automatic) running controller 20.

The vehicular (automatic) running controller 20 controls operations of the braking controller 8 and the engine output controller 9 on the basis of the inter-vehicle distance D detected by means of the inter-vehicle distance sensor 12 and the road wheel velocities VWL and VWR detected by means of the road wheel velocity sensors 13L and 13R. Hence, the vehicular automatic running controller 20 maintains an appropriate inter-vehicle distance between the preceding vehicle and the vehicle following up the preceding vehicle (called, an other vehicle follow-up run control). Together with this, the vehicle is in a deceleration controlled state during a turn of the vehicle. Under this condition, when the preceding vehicle falls out of a detectable range of the inter-vehicle distance sensor 12 so that the preceding vehicle is undetected, the vehicular running controller 20 is operated to maintain the deceleration value immediately before the preceding vehicle falls out of the detectable range as described above.

Next, an operation of the automatic vehicular velocity controller 20 in the first embodiment will be described with reference to operational flowcharts of FIG. 2 and FIG. 3 executed by the vehicular running controller 20.

It is noted that the vehicular (automatic) running controller 20 includes a microcomputer having a CPU (Central Processing Unit), a ROM (Read Only Memory), a RAM (Random Access Memory), an Input port, an Output port, and a common bus, as shown in FIG. 1B.

At a step S1, the CPU of the vehicular running controller 20 reads the inter-vehicle distance D(n) detected by means of the inter-vehicle distance sensor 12.

At a step S2, the CPU of the vehicular running controller 20 determines whether the vehicular running controller 20 should perform the other vehicle follow-up running control.

This determination is based on whether the preceding vehicle has been detected by means of the inter-vehicle distance sensor 12.

Specifically, at the step S2, the CPU of the vehicular running controller 20 determines whether the inter-vehicle distance D(n) detected by means of the inter-vehicle distance sensor 12 is equal to or below a preset inter-vehicle distance detection limit $D_{MAX}$.

If $D(n) \geq DMAX$ at the step S2, the CPU of the vehicular running controller 20 determines that no preceding vehicle is present in the detectable range and the other vehicle follow-up run becomes impossible and the routine of FIG. 2 goes to a step S3.

At the step S3, a cruise speed running control such that the vehicular velocity is maintained at a present vehicular velocity $T_{SET}$ is executed.

Then, the routine returns to the step S1.

On the other hand, if $D(n)<D_{MAX}$ at the step S2, the CPU of the vehicular running controller 20 determines that it is possible for the vehicle to perform the other vehicle follow-up running control and the routine goes to a step S4.

At the step S4, the CPU of the vehicular running controller 20 reads the detected value θ of the steering angle sensor 14. At the next step S5, the CPU of the vehicular running controller 20 determines whether the vehicle is being turned (in a turn state) on the basis of the output signal of the steering angle sensor 14. This determination is based on whether an absolute value of the detected value |θ| of the steering angle sensor is equal to or above a threshold value θs which is a preset value to determine the turn running state. If |θ|<θs at the step S5, the CPU thereof determines that the vehicle is not in the turn state but in an approximately straight run state and the routine goes to a step S6.

At the step S6, the CPU thereof determines whether the preceding vehicle is recognizable by means of the inter-vehicle distance D(n) as in the same way as the step S2. If the preceding vehicle is unrecognizable ($D(n) \geq D_{MAX}$) at the step S1.

If $D(n)<D_{MAX}$ at the step S6 (Yes), the CPU thereof goes to a step S7 in which an other vehicle follow-up running control processing is executed for the vehicle to follow up the preceding vehicle and the routine returns to the step S4.

On the other hand, if the result of the determination at the step S5 is |θ|≧θs (yes), the CPU thereof determines that the vehicle is running in the turn state and the routine goes to a step S8 in which the CPU thereof is in the deceleration run state. This determination is based on whether a target acceleration/deceleration (namely, a target variation rate of the vehicular velocity) G* calculated at a other vehicle follow-up run control processing as will be described later is equal to or smaller than a preset deceleration threshold value –Gs. If G*>–Gs at the step S8 (No), the CPU of the vehicular running controller 20 determines that the vehicle is either in a constant velocity run state (cruise speed run state) or in an acceleration run state. Then, the routine goes to the step S7. If G*≦–Gs (yes) at the step S8, the CPU thereof determines that the deceleration of the vehicle is large and the vehicle is running in the deceleration state and the routine goes to the step S9.

At the step S9, the CPU thereof determines whether the presence of the preceding vehicle is in the recognizable state on the basis of the inter-vehicle distance D(n) in the same way as the step S2 (the step S6). If the presence of the preceding vehicle is recognized (yes) at the step S9, the routine goes to a step S7. If the preceding vehicle is not recognized (No) at the step S9, the routine goes to a step S10.

At the step S10, the CPU thereof carries out a deceleration maintenance control to maintain the present target braking pressure P*(n) for the braking controller 8 so as to maintain the present deceleration value α and the routine returns to the step S4.

Figure 3:
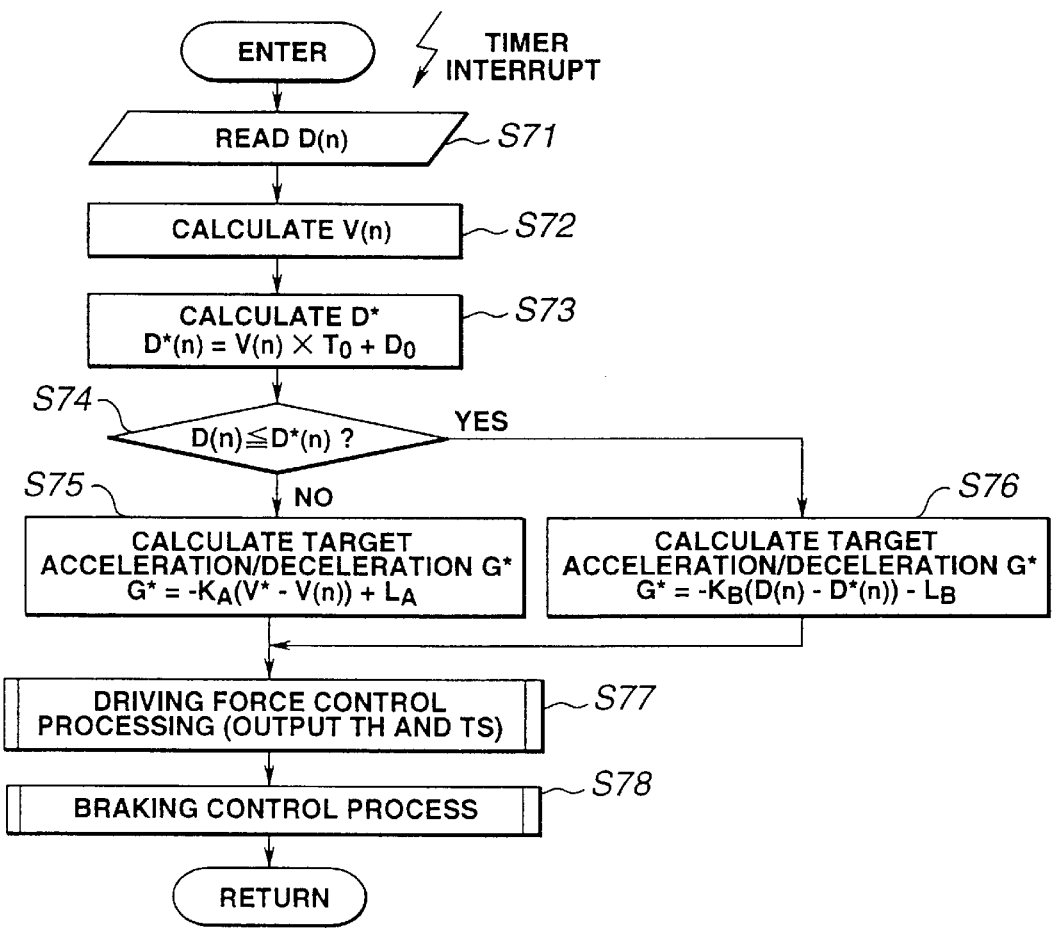
FIG. 3 is an operational flowchart of a timer interrupt routine in the case of the first preferred embodiment shown in FIG. 2.

A specific example of the other-vehicle follow-up running control processing at the step S7 of FIG. 2 is shown in FIG. 3 as a timer interrupt routine.

As shown in FIG. 3, the inter-vehicle distance D(n) between the vehicle and the actual preceding vehicle detected by means of the inter-vehicle distance sensor 12 is read at a step S71.

At the next step S72, the CPU thereof reads road wheel velocities VWL and VWR detected by means of road wheel velocity sensors 13L and 13R. Then, the CPU thereof calculates an average of the detected road wheel velocities VWL and VWR so as to derive a vehicular velocity V(n) of the vehicle. Then, the routine goes to the step S73 in which the CPU of the controller 20 calculates the target inter-vehicle distance D*(n) between the vehicle and the preceding vehicle in accordance with an equation (1) described below from the vehicular velocity V(n) and a time duration To(called, an inter-vehicle time duration) for which the vehicle reaches to a position Lo [m] behind the present preceding vehicle.

$$D^*(n)=V(n) \times To+Do \qquad (1).$$

By adopting a concept of the inter-vehicle time duration, the target inter-vehicle distance D* is set such that as the vehicular velocity V(n) becomes increased, the inter-vehicle distance becomes long. It is noted that in the equation (1), Do denotes the inter-vehicle distance if the vehicle stops.

At the next step S74, the CPU of the vehicular running controller 20 determines whether the presently detected inter-vehicle distance D(n) is equal to or below the calculated target inter-vehicle distance D*(n) (D(n)≦D*(n)).

If No at the step S74 (D(n)>D*(n)), the routine goes to a step S75 since the CPU of the controller 20 determines that the actual inter-vehicle distance D(n) is in excess of the target inter-vehicle distance D*(n) and it is possible for the vehicle to be accelerated to shorten the inter-vehicle distance D(n). At the step S75, the CPU of the controller 20 calculates the target acceleration/deceleration G* in accordance with the following equation (2) on the basis of the present taget vehicular velocity V* and overwrites the calculated target acceleration/deceleration G* into a memory area such as the RAM in which the target acceleration/deceleration G* is stored so as to update G*.

$$G^*=K_A \times (V^*-V(n))+L_A \qquad (2).$$

In the equation (2), $K_A$ and $L_A$ denote constants.

Then, the routine goes to a step S77.

On the other hand, if Yes at the step S74 (D(n)≦D*(n)), the CPU of the controller 20 determines that the presently detected inter-vehicle distance D(n) is equal to or shorter than the target inter-vehicle distance D*(n) and determines that it is necessary to elongate the inter-vehicle distance to decelerate the vehicle. Then, the routine goes to a step S76.

At the step S76, the CPU of the vehicular running controller 20 calculates the target acceleration/deceleration G* using the following equation (3) into the memory area in which the old G* is stored so as to update G*.

Then, the routine goes to the step S77.

$$G^*=K_B \times (D(n)-D^*(n))-L_B \qquad (3).$$

In the equation (3), KB and LB denote constants.

At the step S77, the CPU of the controller 20 derives a command value of the target throttle opening angle TH toward the engine output controller 9 and the command value of an up-shift or down-shift toward the A/T controller 10 and executes a driving force control processing in which the command value(s) described above are outputted to either or both of the other controllers 9 or 10.

Then, the routine goes to a step S78.

The derivation of the command value TH on the opening angle of the throttle valve will be described below.

When the vehicle is accelerated with the target acceleration/deceleration G* indicating positive, the CPU of the controller 20 calculates a variation rate ΔTH of the opening angle of the throttle valve which is increased in a positive direction in accordance with the increase in the target acceleration/deceleration G*.

When the target acceleration/deceleration G* is negative, the CPU of the controller 20 calculates the variation rate ΔTH of the opening angle of the throttle angle which is increased in a negative direction in accordance with the increase in the negative direction of the target acceleration/deceleration while the target acceleration/deceleration G* reaches from zero up to a predetermined value of −Gs. The calculated variation rate ΔTH of the opening angle of the throttle valve is added to the present command value TH to calculate the new command value TH of the opening angle of the throttle valve (ΔTH+TH→TH). When the target acceleration/deceleration G* is negatively in excess of the predetermined value −Gs, the command value TH of the opening angle of the throttle valve is set to zero or in proximity to zero.

In addition, in the case of the command value TS of the up-shift/down-shift to the A/T controller 9, the CPU of the controller 20 refers to a gear-shift control map which is generally the same as that in the normal gear-shift control in the automatic transmission with the command value TH of the opening angle of the throttle valve calculated and the vehicular velocity V(n) so as to derive the up-shift/down-shift command value TS of the automatic transmission 3.

At the step S78, the CPU of the controller 20 calculates a target braking pressure $P_B^*$ on the basis of the target acceleration/deceleration G* calculated in the acceleration/deceleration memory area when the target acceleration/deceleration G* indicates negative.

The calculated target braking pressure P* is outputted to the braking controller 8 as a command value of the braking pressure (this is called a braking pressure control processing).

Then, the interrupt routine of FIG. 3 is ended and the control is returned to the predetermined main routine (e.g., FIG. 2).

Figure 4:
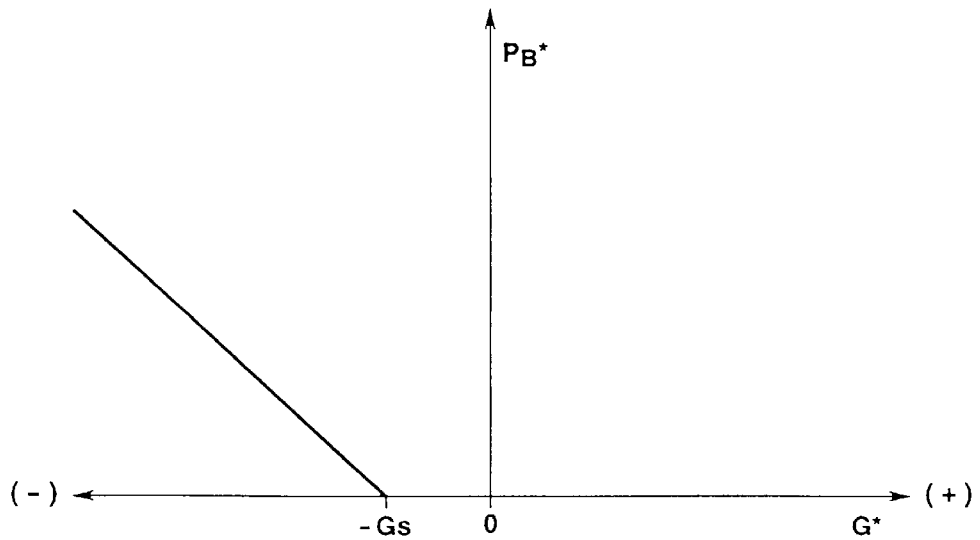
FIG. 4 is a characteristic graph representing an example of a map deriving a target braking pressure PB* representing a relationship between a target acceleration/deceleration G* and the target braking pressure.

It is noted that the target braking pressure $P_B^*$ is calculated by referring to a braking pressure calculation map previously stored in the memory and shown in FIG. 4 on the basis of the target acceleration/deceleration G*.

As shown in FIG. 4, the target acceleration/deceleration G* is taken along a lateral axis and the target pressure $P_B^*$ is taken along a longitudinal axis.

While the target acceleration/deceleration G* is positive or is negatively in excess of the predetermined minus value −Gs, the target braking pressure $P_B^*$ is maintained at zero.

If G*<−Gs, the target braking pressure PB* is linearly increased in proportion to the negative increase in the target acceleration/deceleration G*.

Hence, suppose now that the vehicle is running straight and the preceding vehicle is not present.

In this case, the inter-vehicle distance D(n) detected by means of the inter-vehicle distance sensor 12 becomes infinite so as to become in excess of the detection limit $D_{MAX}$, the routine in FIG. 2 goes to the step S2 to the step S3 so that the braking controller 8, the engine output controller 9, and the A/T controller 10 are mutually operated, thus the cruise speed control being carried out.

Under the present condition, if the CPU of the controller 20 determines that the inter-vehicle distance D(n) by means of the inter-vehicle distance sensor 12 is shorter than the detection limit $D_{MAX}$, the routine goes to the step S4 from the step S2 in which the detected value θ of the steering angle by means of the steering angle sensor 14 is read. Then, the routine goes to the step S5 in which the CPU of the controller 20 determines whether the vehicle is in the turn state. At this time, when the vehicle runs straight, the routine goes to the step S6 in which the CPU of the controller 20 determines whether the preceding vehicle is recognized by means of the inter-vehicle distance sensor 14.

As described above, since the preceding vehicle is recognized, the routine goes to the step S7 in which the other vehicle running control processing is executed.

In the other vehicle running control processing, the CPU of the controller 20 calculates the target inter-vehicle distance D* on the basis of the inter-vehicle distance D(n) and the vehicular velocity V(n). If the inter-vehicle distance D(n) is equal to or below the target inter-vehicle distance D*, the CPU of the controller 20 determines that the inter-vehicle distance to the other vehicle (preceding vehicle) is too near and calculates the target acceleration/deceleration G* corresponding to a minus deceleration in accordance with the equation (3) on the basis of a deviation between the inter-vehicle distance D(n) and the target inter-vehicle distance D*. Then, the CPU of the controller 20 outputs a control signal to the braking controller 8 so that the vehicular acceleration is coincident with the target acceleration/deceleration G*. Each disc brake 7 generates a predetermined braking force.

On the contrary, if the inter-vehicle distance D(n) is in excess of the target inter-vehicle distance D*, the CPU of the controller 20 determines that the inter-vehicle distance to the preceding vehicle is too long and calculates the target acceleration/deceleration G* corresponding to the positive acceleration in accordance with the equation (2) on the basis of the deviation between the target vehicular velocity V* and the vehicular velocity V(n).

Based on the target acceleration/deceleration G*, the controller 20 outputs the control signals to the engine output controller 9 and the gear shift controller 10 so that the vehicular acceleration/deceleration is coincident with the target acceleration/deceleration G*, thus the vehicle generating an acceleration driving force.

Then, while the vehicular running controller 20 executes the above-described other vehicle follow-up control state, the vehicle runs on a corner having a relatively large radius of curvature such as found in a freeway. At this time, the routine shown in FIG. 2 transfers from the step S5 to the step S8. However, since the vehicle can run without deceleration and the vehicle is not decelerated as well as the preceding vehicle when the preceding vehicle is not decelerated, the target acceleration/deceleration G* is larger than the threshold value −Gs at the step S8 (G*>−Gs) and the routine goes to the step S7 to continue the above-described other vehicle follow-up running control process.

However, in a case where the vehicle runs on a tight corner having a relatively small radius of curvature, the preceding vehicle is decelerated accordingly so that the vehicle which is running to follow up the preceding vehicle is also decelerated to maintain the target inter-vehicle distance D* due to a shortening of the inter-vehicle distance D(n).

As described above, when the vehicle is decelerated during the run on the corner, the routine in FIG. 2 goes from the step S8 to the step S9 to determine whether the preceding vehicle is recognized.

When the preceding vehicle is recognized at the step S9 (Yes), the routine goes to the step S7 to continue the other vehicle follow-up running processing.

If the vehicle becomes undetectable state of the preceding vehicle due to the small radius of curvature (a radius of turn is small) of the corner (No at the step S9), the routine transfers from the step S9 to the step S10 to execute the deceleration maintenance control processing to maintain the present deceleration value.

In the deceleration maintenance control processing, the controller 20 outputs the target braking pressure P*(n) to the braking controller 8 to maintain the deceleration value when the preceding vehicle has been recognized and the vehicle has followed up the preceding vehicle.

Consequently, the braking force according to the target braking pressure P*(n) is generated by means of each disc brake 7 so as to maintain the deceleration running state.

Thus, even if the preceding vehicle is continued to be decelerated, the vehicle is also continued to be decelerated. Hence, a quick approach to the inter-vehicle distance is not found and a stable deceleration running state can be maintained.

If the preceding vehicle which is recognized under the deceleration maintenance state, the routine in FIG. 2 is transferred from the step S9 to the step S7.

Hence, in the present routine of FIG. 2, the vehicle is returned to the other vehicle follow-up running control state is returned when the preceding vehicle is recognized. When the vehicle does not recognize the preceding vehicle, the routine in FIG. 2 returns from the step S6 to the step S1 and transfers via the step S2 to the step S3 (S6→S1→S2→S3) so that the vehicle is in the cruise speed control state.

In the first embodiment, when the vehicle becomes unrecognized the preceding vehicle with the other vehicle follow-up run to the preceding vehicle, the vehicle decelerated during the turn on the corner and the vehicular running state is transferred from the other vehicle running control state to the deceleration maintenance state maintaining the deceleration derived during the other vehicle follow-up running control state.

Hence, the stable run of the vehicle can be assured without repetition of the variation in the inter-vehicle distance.

Figure 5:
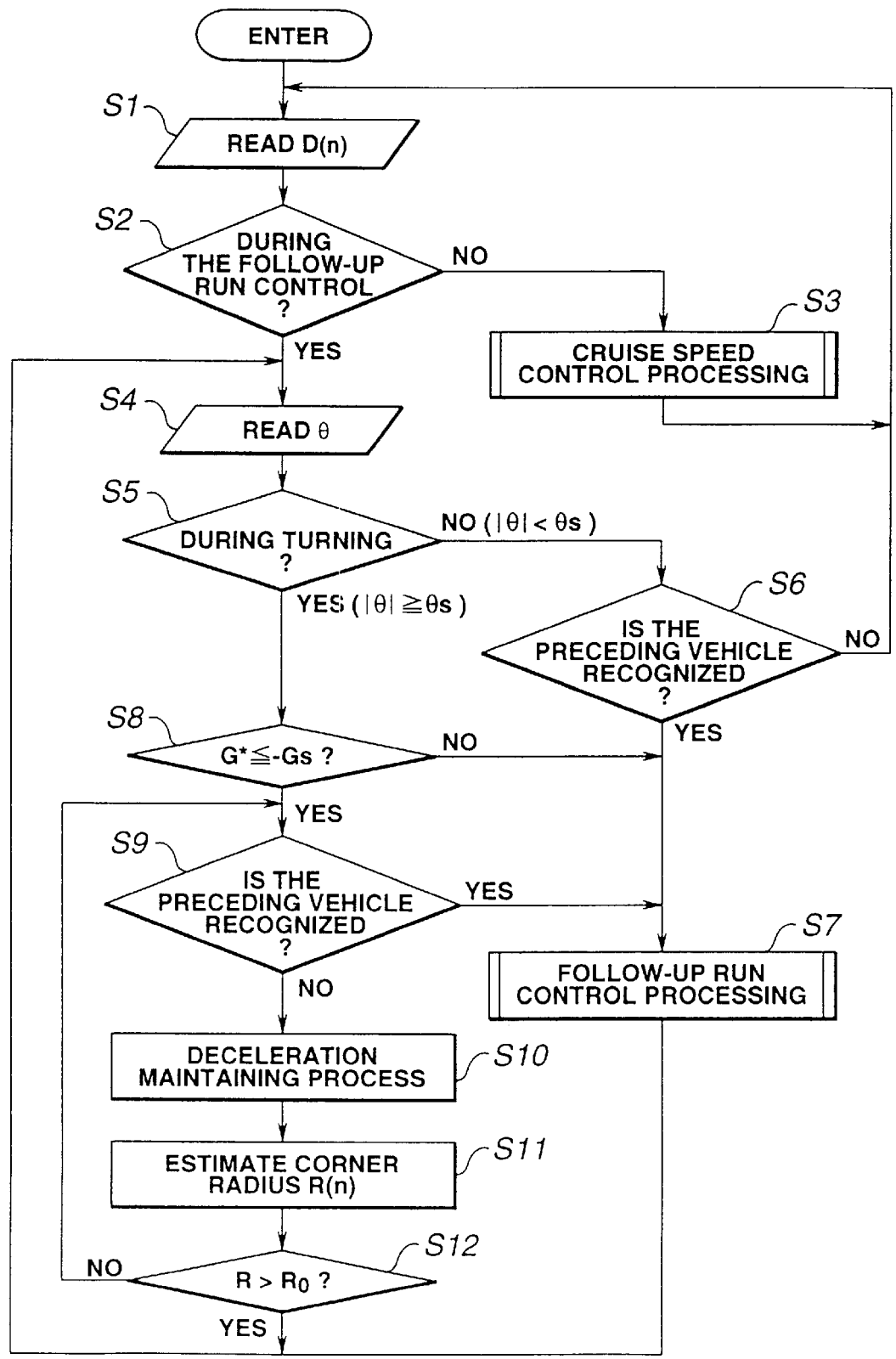
FIG. 5 is an operational flowchart for explaining a modification of the first preferred embodiment shown in FIG. 2.

FIG. 5 shows an operational flowchart in place of that shown in FIG. 2 as a modification of the first embodiment.

In the first embodiment, after the deceleration maintenance processing is carried out at the step S10 and the routine returns to the step S4. However, in the modification shown in FIG. 5, steps S11 and S12 are added after the step S10.

At the step S11, the CPU of the controller 20 estimates the radius of curvature of the corner, i.e., the radius of the turn R of the vehicle on the basis of the present vehicular velocity V(n) and the steering angle θ of the steering angle sensor 14.

At the next step S12, the CPU of the controller 20 determines whether the estimated radius of the turn R is larger than a deceleration control release threshold value Ro.

If R≦Ro at the step S12, the routine returns to the step S9.

If R<Ro at the step S12, the routine returns to the step S4.

In this modification, the deceleration maintenance control state is released when the radius of the corner R becomes larger than the threshold value Ro or when the preceding vehicle is recognized and the vehicle is returned to the other vehicle follow-up running state.

That is to say, in the second embodiment, except respective processing steps we will be described later are interposed after the step S10 in which the deceleration maintenance processing is executed, the same steps as those in FIG. 2 are provided and the explanations as those same steps will herein be omitted.

Namely, the routine goes to the step S10 to the step S21.

At the step S21, the CPU of the vehicular running controller 20 estimates the present radius of curvature R(n) of the corner for the vehicle to be passed on the basis of the present vehicular velocity V(n) and of the steering angle θ of the steering angle sensor 14.

At the step S22, the CPU of the controller 20 determines whether a flag FD indicating a memory-and-control on the radius of the corner is set to "1". If this control flag is reset to "0" (No) at the step S22, the CPU of the controller 20 stores the calculated radius of curvature on the corner as a radius of turn stored value $R_M$ at the step S23.

At the step S25, the CPU of the vehicular running controller 20 determines whether the present radius of the turn R(n) is in excess of the threshold value Ro. The threshold value Ro corresponds to the radius of the corner having a relatively large value and requires no preset deceleration control.

If R≦Ro at the step S25 (No), the CPU of the controller 20 determines that the radius of the turn R (R in FIG. 6) is a radius of curvature of the curved surface requiring the deceleration and the routine goes to a step S26.

At the step S26, the CPU of the controller 20 determines whether a value subtracting the present radius of the present corner R(n) from the stored value $R_M$ of the radius of corner stored in the memory area is in excess of the present threshold value Ro.

If $R_M$–R(n)<Rs (No) at the step S26, the CPU of the controller 20 determines that there is no subsequent large variation in the radius of the turn on the corner and the routine returns to the step S9.

If RM–R(n)≧–Rs at the step S9 (Yes), the CPU of the controller 20 determines that the radius of the turn on the corner becomes small and the routine goes to a step S27.

Figure 7:
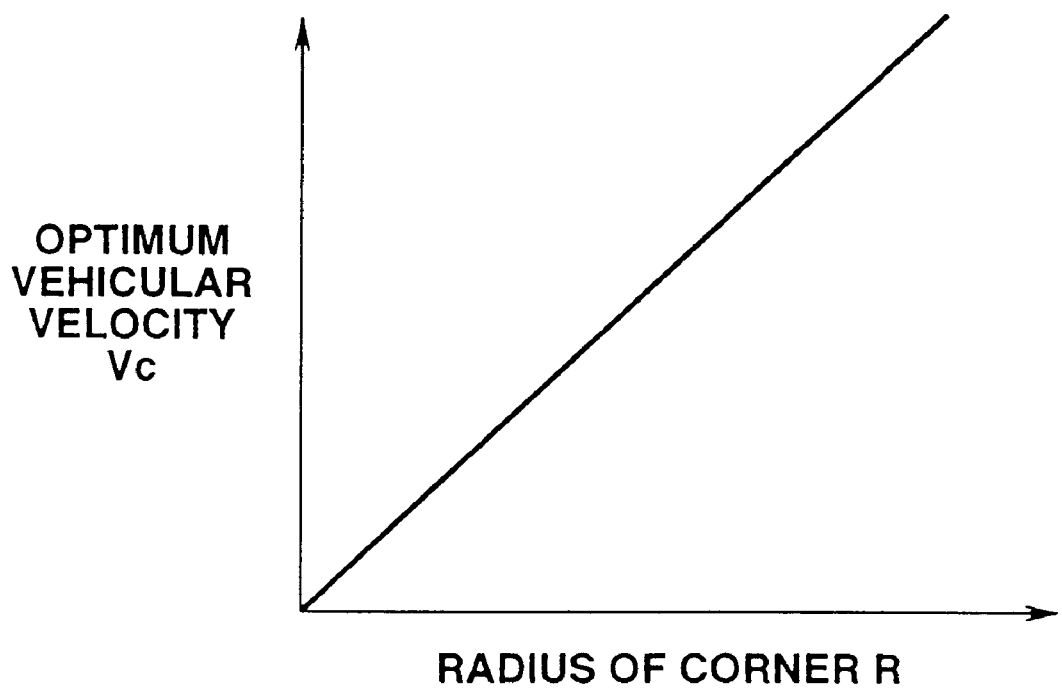
FIG. 7 is a characteristic graph for explaining a map deriving an optimum vehicular velocity Vc representing a relationship between a radius of turn (radius of a corner) and the optimum vehicular velocity 6.

At the step S27, the CPU of the controller 20 refers to a radius-of-turn vehicular velocity derivation map shown in FIG. 7 and representing a relationship between the radius of turn R and an optimum velocity Vc in a case where the vehicle is running on the raduis of turn.

At the next step S28, the CPU of the controller 20 calculates the following equation (5) to derive the present target acceleration/deceleration G*(n) on the basis of the optimum velocity Vc and outputs the target braking pressure P*(n) which corresponds to the calculated target acceleration/deceleration G* to the braking controller 8.

Then, the routine goes to a step S29.

$$G^*(n)=-K_{PB}(V(n)-Vc) \quad (5),$$

wherein $K_{PB}$ denotes a proportional gain.

At the step S29, the CPU of the vehicular running controller 20 stores the present radius of the corner R(n) as a stored value $R_M$ so as to update the old R(n). Then, the routine returns to a step S9.

At the step S29, the CPU of the vehicular running controller 20 stores the present radius R(n) of the corner as the stored value $R_M$ so as to update and returns to the step S9.

On the other hand, if R>Ro as the result of determination at the step S25, the CPU of the vehicular running controller 20 ends the deceleration maintenance control and transfers to the step S30 in which the memory-and-control flag FD of the radius of corner is reset to "0" and the routine returns to the step S4.

In the same manner as in the first preferred embodiment described above, when the preceding vehicle cannot be recognized during the follow-up run in the deceleration state, the routine transfers from the step S9 to the step S10 so as to maintain the deceleration at the time of passing the step S9 of the present routine. Thus, the deceleration maintenance control is carried out.

When the deceleration maintenance control is initiated, the radius of corner R(n) at the step S21 is estimated.

If the status flag FD of the stored state of the radius of corner is reset to "0", the radius of corner R(n) of the corner calculated at the step S23 is stored into a predetermined memory area of the memory as a stored value of the radius of the corner $R_M$. Then, the stored status flag FD on the radius of the corner is set to "1" at the step S24.

Then, the routine goes to the step S25 in which the CPU of the controller 20 determines that R(n)>Ro and goes to the step S26.

If the incremental variable of the present radius of corner to the stored value RM of the radius of corner is small, the CPU of the controller 20 determines that no variation in the radius of the corner occurs and the routine goes to the step S9 to continue the deceleration maintenance processing.

If, during the deceleration maintenance control state, the radius of corner R(n) becomes reduced and the deviation to the stored value RM is equal to or larger than the threshold value Rs, the CPU of the controller 20 determines that a larger deceleration is required and the routine goes to the step S27 in which the CPU of the controller 20 calculates the optimum velocity Vc optimum to run on the radius R(n) of the corner and goes to the step S28 in which the target braking pressure P(n) is calculated on the basis of the deviation ΔVc in the velocity between the optimum velocity Vc and the present vehicular velocity V(n).

The target braking pressure P(n) is calculated and outputted to the braking controller 8.

Consequently, the stable cornering can be achieved with the braking state according to the decrease in the radius of the corner (turn) controlled. The present radius of the turn (corner) R(n) is stored as the stored value Rm and the present deceleration value is maintained.

Thereafter, when the preceding vehicle is recognized, the other vehicle follow-up running control is initiated. In addition, when the radius of the corner is returned to be so large that no deceleration is needed, the routine transfers from the step S25 to the step S30. Then, the memory-and-control flag FD on the radius of the corner is reset to "0" and the routine goes to the step S4. Then, either the other vehicle follow-up running control or the cruise speed control depending on whether the preceding vehicle is recognized is executed.

Next, FIG. 8 shows another flowchart for explaining the operation in the case of a third preferred embodiment of the vehicular automatic running control apparatus according to the present invention.

In the third embodiment, the deceleration is controlled according to a vehicular running situation at the time when the preceding vehicle has been recognized with the vehicular deceleration maintained.

That is to say, in the third embodiment, the steps S26 through S29 described in the second embodiment with reference to FIG. 5 are omitted as shown in FIG. 8. In place of the omitted steps S26 through S29, such a processing as deceleration control processing on the basis of the vehicular velocity as will be described below is added. It is noted that the same steps as described in FIG. 5 are processed in the third embodiment expect the addition of the new steps described above. In addition, in the third embodiment, the same processing as shown in FIG. 6 is carried out and the detailed description related to FIG. 6 will herein omitted.

In the deceleration control processing, if the result of determination at the step S25 indicates R≧Ro, the routine returns to the step S10. If the preceding vehicle is recognized, the routine goes to a step S42 in which the CPU of the controller 20 differentiates the inter-vehicle distance sensor 12 to derive the relative velocity VR(n) between the vehicle and the preceding vehicle.

Figure 6:
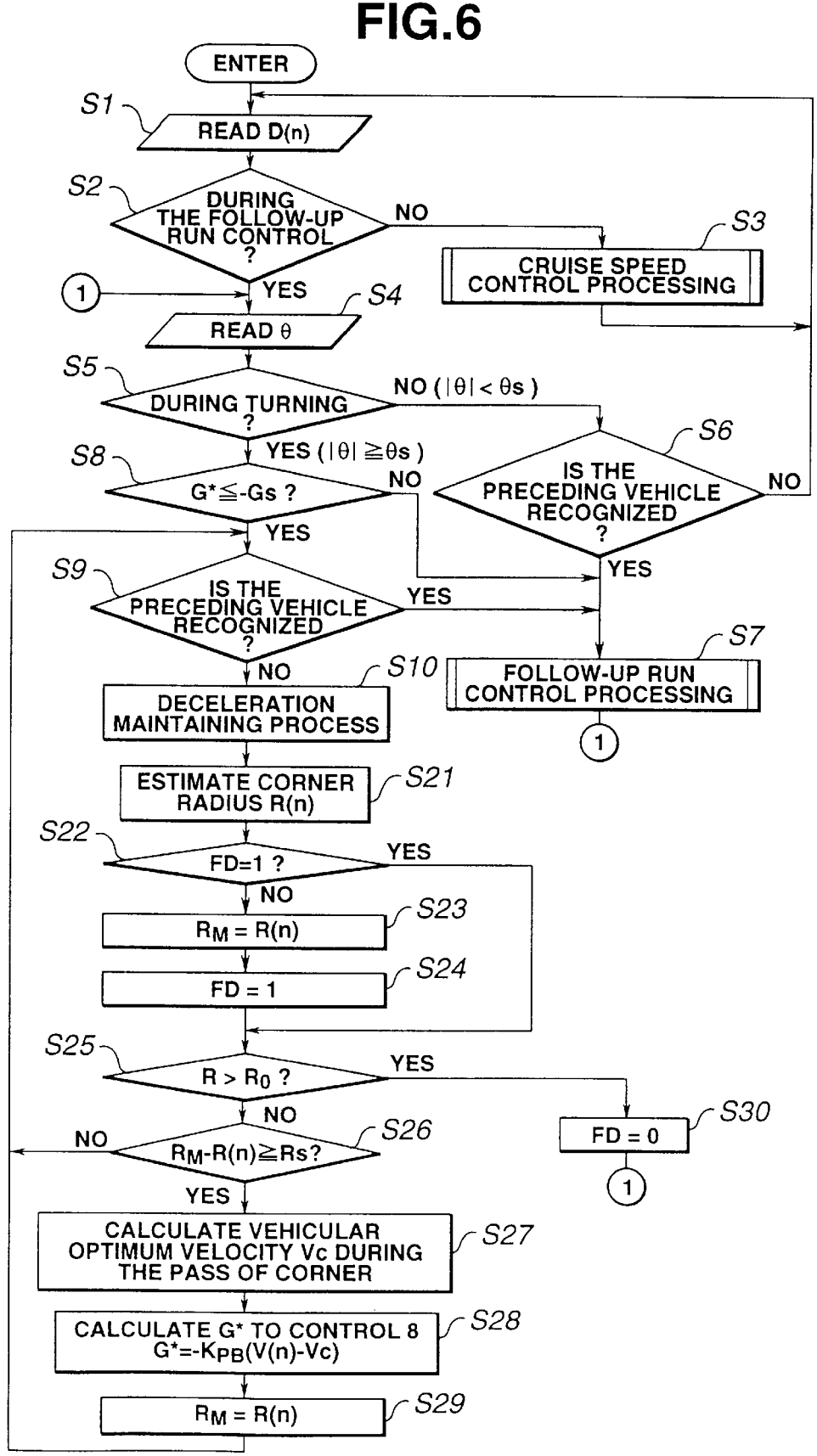
FIG. 6 is another flowchart for explaining a running control release procedure executed by the automatic running controller in a second preferred embodiment according to the present invention.

At the step S43, the CPU of the controller 20 determines whether a value of a subtraction of the present radius of the corner (turn) R(n) from the stored value $R_M$ on the radius of the corner stored in the memory in the same way as the step S26 shown in FIG. 6 is equal to or above a preset threshold value Rs (R(n)−$R_M$≧Rs) at the step S26 in the same way as the step S26 in FIG. 6.

If $R_M$−R(n)<Rs at the step S26, the CPU of the controller 20 determines that no large variation occurs in the radius of the corner and the routine goes to a step S44.

At the step S44, the CPU of the controller 20 determines whether the relative velocity VR(n) is equal to zero or positive.

If VR(n)≧0 at the step S44, the CPU of the vehicular running controller 20 calculates the target braking pressure P*(n) so as to maintain the present vehicular velocity.

After the target braking pressure P*(n) is outputted to the braking controller 8, the routine goes to the step S21.

If VR(n)<0 at the step S21, the CPU of the vehicular running controller 20 determines that the inter-vehicle distance D tends to be shortened and the routine goes to a step S46.

At the step S46, the CPU of the controller 20 calculates a differentiation of a second order for the inter-vehicle distance to derive a relative acceleration between the vehicle and the preceding vehicle. The CPU of the controller 20 subtracts the vehicular acceleration which is a differentiation for the vehicular velocity V(n) from the relative acceleration to derive a vehicular deceleration Gt on the preceding vehicle.

After the target braking pressure P*(n) according to the deceleration Gt on the preceding vehicle is outputted from the braking controller 8, the routine returns to the step S21.

When the result of determination at the step S43 indicates RM−R(n)≧Rs, the CPU of the controller 20 determines that the radius of the corner becomes small.

Then, the routine goes to a step S47 to derive the optimum velocity Vc which is optimum to the radius of the turn. Then, the routine goes to a step S48.

At the step S48, the CPU of the controller 20 calculates the target acceleration/deceleration G* in accordance with the equation (5) on the basis of a deviation between the optimum velocity Vc and the present vehicular velocity V(n).

At the next step S49, the CPU of the controller 20 stores the radius of the corner R(n) as the stored value RM and goes to a step S50 in which the CPU of the controller 20 determines whether the relative velocity VR(n) is equal to or positive.

If VR(n)≧0 at the step S50, the routine goes to a step S51 in which the CPU of the controller 20 calculates the target braking pressure P*(n) on the basis of the target acceleration/deceleration G* calculated at the step S48 and outputs the value of G* to the braking controller 8 so as to adjust the deceleration according to the radius of the corner. Then, the routine goes to the step S21.

On the other hand, if VR(n)<0 at the step S50, the routine goes to a step S52.

At the step S52, the CPU of the vehicular running controller 20 carries out the differentiation of second order for the inter-vehicle distance detected by means of the inter-vehicle distance 12 to derive the relative acceleration/deceleration between the vehicle and the preceding vehicle.

If the CPU of the controller 20 subtracts the vehicular acceleration which is the differentiation of the vehicular velocity V(n) from the relative acceleration to derive the deceleration Gt on the preceding vehicle.

Then, the routine goes to the step S21. At the step, the CPU thereof outputs the target braking pressure P*(n) according to the preceding vehicle Gt to the braking controller 8.

On the other hand, if the result of determination includes $R_M-R(n)>Rs$ at the step S43, the CPU of the controller 20 determines that the radius of the corner becomes short and the routine goes to a step S47.

At the step S48, the CPU of the controller 20 calculates the target deceleration G* in accordance with the equation (5) on the basis of the deviation A between the optimum velocity Vc and the present vehicular velocity V(n).

Next, the routine goes to a step S49 in which the radius of the corner R(n) is stored as the stored value RM and the routine goes to a step S50.

At the step S50, the CPU of the controller 20 determines whether $VR(n) \geqq 0$.

If $VR(n) \geqq 0$ at the step S51, the routine goes to a step S51. At the step S51, the CPU of the controller 20 calculates the target braking pressure P*(n) on the basis of the target deceleration G* calculated at the step S48 and outputs the value of P*(n) to the braking controller 8 so as to adjust the deceleration according to the radius of the corner. Thus, the routine returns to the step S21.

On the other hand, if VR(n)<0 at the step S50, the routine goes to a step S52. At the step S52, the CPU of the controller 20 carries out the differentiation of the second order for the inter-vehicle distance detected by means of the inter-vehicle distance detector 12 to derive the relative acceleration between the vehicle and the preceding vehicle. If the CPU of the controller 20 subtracts the vehicular acceleration which is the differentiation of the vehicular velocity V(n) from the relative acceleration to derive the deceleration Gt on the preceding vehicle.

On the other hand, if the result of determination indicates $R_M-R(n) \geqq Rs$ at the step S40, the CPU of the vehicular running controller 20 determines that the radius of the corner becomes short and the routine goes to a step S47.

At the step S48, the CPU of the controller 20 calculates the target deceleration G* in accordance with the equation (5) on the basis of the deviation ΔVc between the optimum velocity Vc and the present vehicular velocity V(n).

Next, the routine goes to a step S49 in which the radius of the corner R(n) is stored as the stored value RM and the routine goes to a step S50.

At the step S50, the CPU of the controller 20 determines whether $VR(n) \geqq 0$.

If $VR(n) \geqq 0$ at the step S51, the routine goes to a step S51. At the step S51, the CPU of the vehicular running controller 20 calculates the target braking pressure P*(n) to the braking controller 8 so as to control the deceleration according to the radius of the corner. Then, the routine goes to the step S21.

On the other hand, if the result of determination at the step S50 is VR(n)<0, the routine goes to a step S52 in which the inter-vehicle distance detected by means of the inter-vehicle distance sensor 12 is differentiated having the second order. Hence, the relative acceleration between the vehicle and the preceding vehicle is calculated. The CPU of the relative acceleration subtracts the acceleration of the vehicle which is the differentiation of the vehicular velocity V(n) to derive the deceleration Gt on the preceding vehicle. Then, the routine goes to a step S53 in which the target deceleration Gt of the vehicle calculated at the step S48 is larger than the deceleration Gt on the preceding vehicle. If G*>Gt at the step S53, the routine goes to the step S51 in which the target braking pressure P*(n) which accords with the target deceleration G* is outputted to the braking controller 8. Then, the routine goes to the step S21. If $G^* \leqq Gt$, the routine goes to the step S54 in which the target braking pressure P*(n) which accords with the deceleration Gt on the preceding vehicle is outputted to the braking controller 8. Then, the routine goes to the step S21.

In the third embodiment, when the preceding vehicle is recognized after the vehicle is in the deceleration maintenance state and the CPU of the vehicular running controller 20 determines that there is a little or no variation in the radius of the corner, the present vehicular velocity is maintained when the relative velocity, i.e., VR(n) is positive. If VR(n) is negative, the vehicular velocity is controlled in accordance with the deceleration of the preceding vehicle to maintain the inter-vehicle distance. If there is a small variation in the radius of the corner, the controller 20 controls the deceleration in accordance with the radius of the corner when VR(n) indicates negative.

Therefore, when the preceding vehicle is recognized after the deceleration maintenance state, the control is not immediately returned to the other-vehicle follow-up running control.

The CPU of the vehicular running controller 20 determines the running situation on the basis of the radius of the corner and the relative velocity between the vehicle and the preceding vehicle and sets the deceleration according to these variables. Hence, an optimum deceleration control according to the running situation can be achieved.

It is noted that, in the third embodiment, the radius of the corner R is estimated on the basis of the vehicular velocity V(n) and the steering angular displacement θ.

However, the radius of the corner R may be estimated on the basis of the vehicular velocity V(n), the yaw rate detected by means of the yaw rate sensor, or the lateral acceleration detected by means of the lateral acceleration sensor.

In addition, in the third embodiment, the vehicular deceleration is differentiated by means of the vehicular velocity V(n).

However, as an alternative, a longitudinal acceleration sensor which detects an acceleration in a longitudinal direction of the vehicle body may be installed.

Furthermore, in each embodiment, although the vehicular velocity feedback equation recited in the equation (2) in the follow-up running control procedure and the inter-vehicle distance feedback equation (3) are in a Proportional (P) control mode, a Proportional-Differential control mode or a Proportional-Integration-Differential control mode may be applied to these equations.

Furthermore, in each preferred embodiment, the target inter-vehicle distance D is calculated in the other vehicle follow-up running control. The target inter-vehicle distance D* and the actual inter-vehicle distance D are compared to calculate the target acceleration/deceleration G*. However, the target vehicular velocity V*(n) is determined so that the inter-vehicle time duration To for the vehicle to be reached to the distance Lo(n) behind the preceding vehicle on the basis of the inter-vehicle distance D(n). The engine output command value α based on the deviation ΔV(n) between the actual vehicular velocity V(n) and the target vehicular velocity V*(n).

Or alternatively, a vehicular velocity calculator used in an anti-skid control system may be applied.

In addition, in each embodiment, a continuously variable transmission 3 may be installed on the output shaft of the engine 2 in place of the automatic transmission 3.

The present invention is also applicable to a front-drive vehicle or to a four-wheel drive vehicle.

The present invention is applicable to an electric vehicle to which an electric motor is adopted in place of the engine 2 or a hybrid vehicle to which the engine 2 and the motor are used. In this case, an electric motor controller may be applied in place of the engine output controller.

If the engine output command value α is positive, the engine is controlled so as to be in the acceleration state. If α is positive, the engine is controlled so as to be in the acceleration state. If α is negative, the target braking pressure may be set in place of PD control and Proportional-Integration-Differential (PID) control mode on the basis of the velocity deviation ΔV(n).

Or alternatively, a vehicular velocity calculator used in an anti-skid control system may be applied.

In addition, in each embodiment, a continuously variable transmission 3 may be installed on the output shaft of the engine 2 in place of the automatic transmission 3.

The present invention is also applicable to a front-drive vehicle or to a four-wheel drive vehicle. The present invention is also applicable to an electric vehicle to which an electric motor is adopted in place of the engine 2 or a hybrid vehicle to which the engine 2 and the motor are used. In this case, an electric motor controller may be applied in place of the engine output controller.

If the engine output command value α is positive, the engine is controlled so as to be in the acceleration state. If α is negative, the target braking pressure may be set in the PD control mode and in the PID control mode on the basis of the velocity deviation ΔV(n).

In each preferred embodiment, an average value on road wheel velocities of driven wheels is calculated to derive the vehicular velocity V(n) of the vehicle itself.

However, the vehicular velocity may be calculated by detecting the number of revolutions per time of an output shaft of the automatic transmission 3.

Or alternatively, a vehicular velocity calculator used in an anti-skid control system may be applied.

In addition, in each embodiment, a continuously variable transmission 3 may be installed on the output shaft of the engine 2 in place of the automatic transmission 3.

The present invention is also applicable to a front-drive vehicle or to a four-wheel drive vehicle.

The present invention is also applicable to an electric vehicle to which an electric motor is adopted in place of the engine 2 or a hybrid vehicle to which the engine 2 and the electric motor are used. In this case, an electric motor controller may be applied in place of the engine output controller.

The entire contents of a Japanese Patent Application No. P10-93031 (filed on Apr. 6, 1998) are herein incorporated by reference.

Although the invention has been described above by reference to certain embodiments of the present invention, the present invention is not limited to the embodiments described above. Modifications and variations of the embodiments described above will occur to those skilled in the art, in light of above teachings.

The scope of the present invention is defined with reference to the following claims.

What is claimed is:

1. An apparatus for an automotive vehicle, comprising:
   an inter-vehicle distance detector for detecting an inter-vehicle distance from the vehicle to another vehicle which is running at the detected inter-vehicle distance with respect to the vehicle;
   a vehicular running controller for effecting a vehicular running control such that the vehicle follows up the other vehicle maintaining the inter-vehicle distance to the other vehicle at a predetermined inter-vehicle distance;
   an inter-vehicle distance determinator for determining whether the inter-vehicle distance detector transfers from a first state in which the inter-vehicle distance to the other vehicle is detected to a second state in which the inter-vehicle distance to the other vehicle is undetected;
   a deceleration controlled state determinator for determining whether the vehicle is in a deceleration controlled state when the inter-vehicle distance determinator determines that the vehicle has transferred from the first state to the second state; and
   a deceleration keep command generator for generating and outputting a vehicular deceleration keep command to the vehicular running controller to maintain a vehicular deceleration at a value which is immediately before the inter-vehicle distance determinator determines that the inter-vehicle distance detector has transferred from the first state to the second state when the deceleration controlled state determinator determines that the vehicle is in the deceleration controlled state.

2. An apparatus for an automotive vehicle as claimed in claim 1, further comprising: another inter-vehicle distance determinator for determining whether the inter-vehicle distance detector has returned from the second state to the first state after the vehicular deceleration keep command has been generated and outputted to the vehicular running controller; and a setter for setting the vehicular deceleration according to a relative velocity between the velocities of the vehicle and the other vehicle.

3. An apparatus for an automotive vehicle as claimed in claim 1, further comprising a releaser for releasing the vehicular keep command when a radius of a turn of the vehicle becomes equal to or larger than a set radius of turn after the deceleration keep command has been generated and outputted to the vehicular running controller.

4. An apparatus for an automotive vehicle as claimed in claim 1, further comprising: a deceleration increment command generator for generating a deceleration increment command to increment the vehicular deceleration according to a radius of turn of the vehicle when the radius of turn becomes small during the deceleration keep command generator generating and outputting the deceleration keep command to the vehicular running controller.

5. An apparatus for an automotive vehicle as claimed in claim 1, further comprising: a steering angular displacement sensor for detecting a steering angular displacement of a vehicular steering wheel; a steering angular displacement determinator for determining whether the steering angular displacement of the steering wheel is equal to or above a predetermined value so as to determine whether the vehicle is being turned; a target acceleration/deceleration calculator for calculating a target acceleration/deceleration G* for the vehicle to be accelerated or decelerated so as to follow up the other vehicle on the basis of the inter-vehicle distance to the other vehicle and the detected vehicular velocity; and a target acceleration/deceleration determinator for determining whether the target acceleration/deceleration G* is equal to or below a predetermined deceleration −Gs, wherein the inter-vehicle distance determinator includes a detectable range determinator for determining whether the detected inter-vehicle distance D(n) is equal to or below an inter-vehicle distance maximum limit $D_{MAX}$ when the target acceleration/deceleration G* is equal to or below the predetermined deceleration −Gs, and wherein the deceleration keep command is generated and outputted to the vehicular running controller after the first determinator determines that the detected inter-vehicle distance D(n) is above the inter-vehicle maximum limit $D_{MAX}$.

6. An apparatus for an automotive vehicle as claimed in claim 5, wherein the vehicular running controller generates and outputs a target braking liquid pressure P*(n) in accordance with the calculated target acceleration/deceleration G* to a braking controller, the braking controller controlling a braking liquid pressure of a vehicular braking system in accordance with the target braking liquid pressure P*(n) when the target acceleration/deceleration determinator determines that G*≦−Gs so as to decelerate the vehicle to the target acceleration/deceleration G*.

7. An apparatus for an automotive vehicle as claimed in claim 6, further comprising: a radius of turn estimator for estimating a radius of turn R on the basis of the present vehicular velocity V(n) and the present steering angular displacement θ after the deceleration keep command has been generated and outputted to the vehicular running controller; a radius-of-turn determinator for determining whether the radius of turn R of the vehicle is in excess of a threshold value Ro and wherein the acceleration/deceleration keep command generator is released when the radius-of-turn determinator determines that R≦Ro and the detectable range determinator determines D(n)≦$D_{MAX}$.

8. An apparatus for an automotive vehicle as claimed in claim 1, further comprising: a vehicular velocity detector for detecting a vehicular velocity V(n) of the vehicle; a steering angle sensor for detecting a steering angular displacement θ of a steering wheel of the vehicle; a radius-of-turn estimator for estimating a radius of a turn R(n) of the vehicle on the basis of the steering angular displacement θ of the steering wheel and the present vehicular velocity V(n); a radius of turn determinator for determining whether the radius of the turn R of the vehicle is in excess of a first threshold value Ro so as to determine whether the radius of the turn is as large as exceeding the first threshold value (Ro); a radius-of-turn memory for storing the present radius of the turn as a stored value of the radius of the turn $R_M$ when the radius-of-turn determinator determines that R≦Ro; a radius-of-turn variation determinator for determining whether a present variation rate of the radius of the turn ($R_M$−R(n)) is equal to or larger than a second threshold value Rs when the radius-of-turn variation determinator determines that R≦Ro; and an optimum vehicular velocity calculator for calculating an optimum vehicular velocity according to the radius of the turn R when the radius-of-turn variation determinator determines that $R_M$−R(n)≧Rs.

9. An apparatus for an automotive vehicle as claimed in claim 8, further comprising a target acceleration/deceleration calculator for calculating a present target acceleration/deceleration G*(n) as a function of the optimum vehicular velocity Vc and the present vehicular velocity V(n).

10. An apparatus for an automotive vehicle as claimed in claim 9, wherein the target acceleration/deceleration calculator calculates the target acceleration/deceleration G*(n) as follows: G*(n)=−$K_{PB}$ (V(n)−Vc), wherein $K_{PB}$ denotes a proportional gain.

11. An apparatus for an automotive vehicle as claimed in claim 10, further comprising a present radius of the turn memory for storing the present radius of the turn R(n) to update the stored value $R_M$ after the target acceleration/deceleration calculator calculates the target acceleration/deceleration G*.

12. An apparatus for an automotive vehicle as claimed in claim 8, wherein when the radius-of-turn determinator determines that R>Ro, the deceleration keep command generator halts the generation of the vehicular deceleration keep command.

13. An apparatus for an automotive vehicle as claimed in claim 12, further comprising a braking controller for calculating a target braking liquid pressure P*(n) according to the target acceleration/deceleration G* and controlling a braking liquid pressure so as to coincide with the target braking liquid pressure.

14. An apparatus for an automotive vehicle as claimed in claim 8, wherein the inter-vehicle distance determinator includes an other vehicle presence determinator for determining whether the inter-vehicle distance detector falls in the first state or in the second state when the radius-of-turn determinator determines that R≦Ro and further comprising; a relative velocity calculator for calculating a relative velocity VR(n) between the other vehicle and the vehicle when the other vehicle presence determinator determines that the inter-vehicle distance detector falls in the first state; a relative velocity determinator for determining whether the calculated relative velocity VR(n) is equal to or above zero when the radius-of-turn variation determinator determines that $R_M$−R(n)<Rs; an other vehicle deceleration calculator for calculating a vehicular deceleration Gt of the other vehicle on the basis of the relative velocity VR(n) and the inter-vehicle distance D(n) when the relative velocity determinator determines that VR(n)<0; and a target braking liquid pressure calculator for calculating a target braking liquid pressure P*(n) according to the vehicular deceleration Gt of the other vehicle.

15. An apparatus for an automotive vehicle as claimed in claim 14, further comprising: a present vehicular velocity keep command generator for generating a present vehicular velocity keep command to maintain the vehicular velocity at the value equal to the present vehicular velocity when the relative velocity determinator determines that VR(n)≧0.

16. An apparatus for an automotive vehicle as claimed in claim 14, further comprising an optimum velocity calculator for calculating an optimum vehicular velocity Vc according to the radius of the turn (R) which is effective when the radius-of-turn variation determinator determines that $R_M$−R (n)≧Rs; a target deceleration calculator for calculating a target deceleration G* of the vehicle as follows: G*=−$K_{PB}$ (V(n)−Vc), wherein $K_{PB}$ denotes a proportional gain; a relative velocity determinator for determining the relative velocity VR(n) is equal to or above zero; and a target braking liquid pressure calculator for calculating a target braking liquid pressure P*(n) on the basis of the target deceleration G* when the relative velocity determinator determines that VR(n)≧0, the target braking liquid pressure P*(n) being outputted to a braking controller, the braking controller controlling a braking liquid pressure of a braking system of the vehicle in accordance with the target braking liquid pressure P*(n).

17. An apparatus for an automotive vehicle as claimed in claim 16, further comprising an other vehicle deceleration calculator for calculating a deceleration Gt of the other vehicle on the basis of the relative velocity between the other vehicle and the vehicle; and a deceleration determinator for determining whether the target acceleration/deceleration G* is above the deceleration of the other vehicle Gt, and wherein the target braking liquid pressure calculator calculates the target braking liquid pressure P*(n) according to the target acceleration/deceleration G* when the deceleration deteminator determines that G*>Gt and according to the deceleration Gt of the other vehicle when the deceleration determinator determines that $G^* \leq Gt$.

18. An apparatus for an automotive vehicle as claimed in claim 17, wherein the other vehicle deceleration calculator calculates a relative acceleration between the other vehicle and the vehicle from a differentiation of a second order for the inter-vehicle distance D(n) and subtracts a vehicular acceleration from the relative acceleration so as to calculate the vehicular deceleration of the other vehicle.

19. An apparatus for an automotive vehicle, comprising:
inter-vehicle distance detecting means for detecting an inter-vehicle distance from the vehicle to another vehicle which is running at the detected inter-vehicle distance with respect to the vehicle;
vehicular running controlling means for effecting a vehicular running control such that the vehicle follows up the other vehicle maintaining the inter-vehicle distance to the other vehicle at a predetermined inter-vehicle distance;
inter-vehicle distance determining means for determining whether the inter-vehicle distance detector transfers from a first state in which the inter-vehicle distance to the other vehicle is detected to a second state in which the inter-vehicle distance to the other vehicle is undetected;
deceleration controlled state determining means for determining whether the vehicle is in a deceleration controlled state when the inter-vehicle distance determining means determines that the vehicle has transferred from the first state to the second state; and
deceleration keep command generating means for generating and outputting a vehicular deceleration keep command to the vehicular running controlling means to maintain a vehicular deceleration at a value which is immediately before the inter-vehicle distance determining means determines that the inter-vehicle distance determining means has transferred from the first state to the second state when the deceleration controlled state determining means determines that the vehicle is in the deceleration controlled state.

20. A method applicable to an automotive vehicle, comprising:
detecting an inter-vehicle distance from the vehicle to another vehicle which is running at the detected inter-vehicle distance with respect to the vehicle through an inter-vehicle distance detector;
effecting a vehicular running control such that the vehicle follows up the other vehicle maintaining the inter-vehicle distance to the other vehicle at a predetermined inter-vehicle distance;
determining whether the inter-vehicle distance detector transfers from a first state in which the inter-vehicle distance to the other vehicle is detected to a second state in which the inter-vehicle distance to the other vehicle is undetected;
determining whether the vehicle is in a deceleration controlled state when determining that the vehicle has transferred from the first state to the second state; and
generating a vehicular deceleration keep command to maintain a vehicular deceleration at a value which is immediately before determining that the inter-vehicle distance detector has transferred from the first state to the second state when determining that the vehicle is in the deceleration controlled state.

* * * * *